United States Patent [19]
Cassady, Jr. et al.

[11] 3,724,168
[45] Apr. 3, 1973

[54] ROW CROP HARVESTING METHOD AND APPARATUS

[75] Inventors: Henry W. Cassady, Jr., San Jose; Robert E. Stilwell, Santa Clara, both of Calif. 93110

[73] Assignee: FMC Corporation, San Jose, Calif.

[22] Filed: June 21, 1971

[21] Appl. No.: 154,928

[52] U.S. Cl. .......................... 53/3, 53/391, 198/233, 214/83.26, 214/522
[51] Int. Cl. ............................................. B65b 67/02
[58] Field of Search ....... 53/3, 35, 391; 214/83, 83.1, 214/152, 83.14, 83.26, 83.36, 520–522; 198/78, 79, 233

[56] References Cited

UNITED STATES PATENTS

| | | | |
|---|---|---|---|
| 3,258,142 | 6/1966 | Girardi | 214/83.1 |
| 2,647,525 | 8/1953 | Duda et al. | 53/391 X |
| 3,460,327 | 8/1969 | Johnson et al. | 302/21 X |
| 2,713,447 | 7/1955 | Maner | 53/391 |

FOREIGN PATENTS OR APPLICATIONS

| | | | |
|---|---|---|---|
| 404,726 | 2/1968 | Australia | 214/522 |

*Primary Examiner*—Robert L. Spruill
*Attorney*—F. W. Anderson et al.

[57] ABSTRACT

A row crop harvester having elongated boom conveyors which may be adjusted to positions parallel to the boundary roads of a field being harvested when the harvester is being driven parallel to the rows whether or not the rows are perpendicular or at an acute angle relative to the boundary roads. The boom conveyors are also horizontally and vertically adjustable to a transport position where they are directed rearwardly of the harvester and upwardly to an angle of about 30 degrees. The harvester further includes a sorting station, a packing station, a pallet unloading station, and a vacuum conveying system for rapidly but gently handling soft produce.

9 Claims, 12 Drawing Figures

FIG. 1

INVENTORS
HENRY W. CASSADY, JR
ROBERT E. STILWELL

BY C.E. Tripp -ATTY
A.J. Moore -AGENT

FIG.3

FIG_5

FIG_6

FIG_7

ROW CROP HARVESTING METHOD AND APPARATUS

BACKGROUND OF THE INVENTION

1. Field of the Invention

This invention pertains to the harvesting art and more particularly relates to a mobile harvester capable of simultaneously harvesting a plurality of rows of produce, sorting and packaging the produce, and discharging pallet loads of sorted produce on the ground.

2. Description of Prior Art

Row crop harvesters such as those disclosed in U.S. Pat. to Jackson No. 2,321,387 and Duda et al. No. 2,647,525 disclose multi-row winged harvesters with packing stations thereon. However, these patents do not disclose the concept of horizontally pivoting the boom conveyors into any one of a number of selected harvesting positions which may or may not be perpendicular to the path of movement of the harvester. Since horizontal pivotal movement of the wings of these prior art harvesters out of their perpendicular harvesting position during the harvesting operation would move the outboard wing supporting wheels out of their desired paths of movement between adjacent rows of produce, and possibly onto the rows themselves, these wings must be maintained perpendicular to the path of movement of the vehicle during the harvesting operation.

SUMMARY OF THE INVENTION

The row crop harvester of the present invention includes a pair of vertically and horizontally pivoted wings or boom conveyors which are supported solely from the chassis of the harvester and are devoid of outboard wheels. Operator controlled hydraulic means are provided to adjust the level of the boom conveyors vertically, and also to independently adjust the horizontal positions of the boom conveyors. During the harvesting operation these boom conveyors may be adjusted horizontal to a position parallel to the boundary road, which parallel position may or may not be perpendicular to the direction of movement of the harvester, thereby permitting a plurality of pickers who follow the wings to begin picking at the same time.

The pickers place the produce, such as the strawberries, onto the boom conveyors for movement inwardly onto a receiving conveyor, then to an elevator, and finally to a sorting conveyor. The berries can be manually sorted while on the sorting conveyor into three groups; which groups include culls that are guided downwardly, to fall on the ground, juice berries which are conveyed by a vacuum conveyor into bulk containers such as fifty-five gallon drums, and a third group of high grade berries which are packaged into baskets and/or crates by packaging personnel. The filled crates are thereafter manually loaded onto one of two pallets supported by pairs of fork lift tines at the front of the harvester. After moving across the field and turning onto the boundary road at the end of the rows just harvested, the filled pallets are lowered to the ground for subsequent handling by other equipment. After the pallet is lowered to the ground the harvester is backed away from the filled pallet, the fork lift tines raised to loading position, and the harvester is driven into the field to harvest the next adjacent series of rows.

It is therefore one object of the present invention to provide a mobile winged harvester which receives produce from manual pickers, who simultaneously pick the fruit from a plurality of rows, and which then conveys the picked fruit past manual sorters who sort the fruit into separate categories for packaging or discharge from the machine at different locations.

Another object is to provide a mobile harvester having wings which are capable of being horizontally adjusted into harvesting positions that are parallel to the boundary roads, but not necessarily perpendicular to the path of travel of the harvester, thereby enabling all of the pickers to begin picking at the same time.

DESCRIPTION OF THE PREFERRED EMBODIMENT

Figure 9:
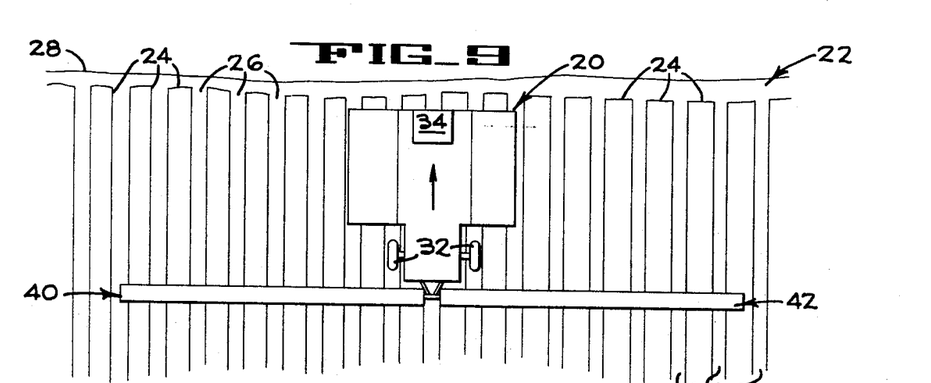
FIG. 9 is an operational view in plan illustrating each wing in a harvesting position that is perpendicular to the path of movement of the vehicle.
Figure 10:
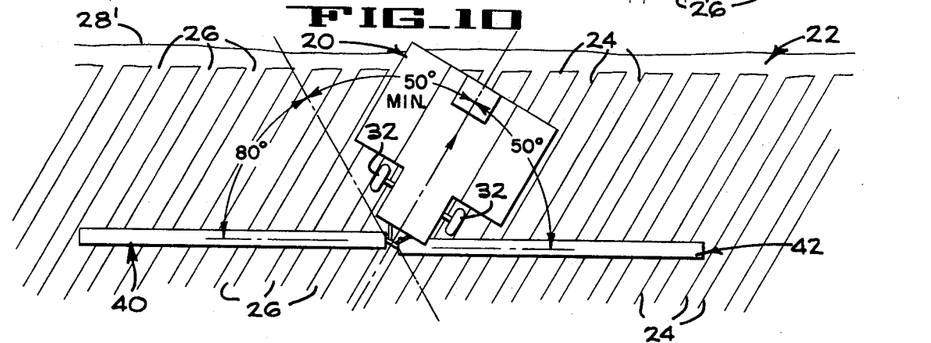
FIG. 10 is an operational view in plan illustrating each wing in a harvesting position that is parallel to the boundary road but is angled relative to the longitudinal axis of the vehicle and of the rows being harvested.

The row crop harvester 20 (FIGS. 9, 10 and 12) of the present invention is specifically designed to harvest strawberries from a field 22 having rows or ridges 24 of berries separated by valleys 26. The rows 24 may be perpendicular to the boundary roads 28 of the field as illustrated in FIG. 9 or may be disposed at an angle other than a right angle to the boundary road 28' as illustrated in FIG. 10.

Figure 1:
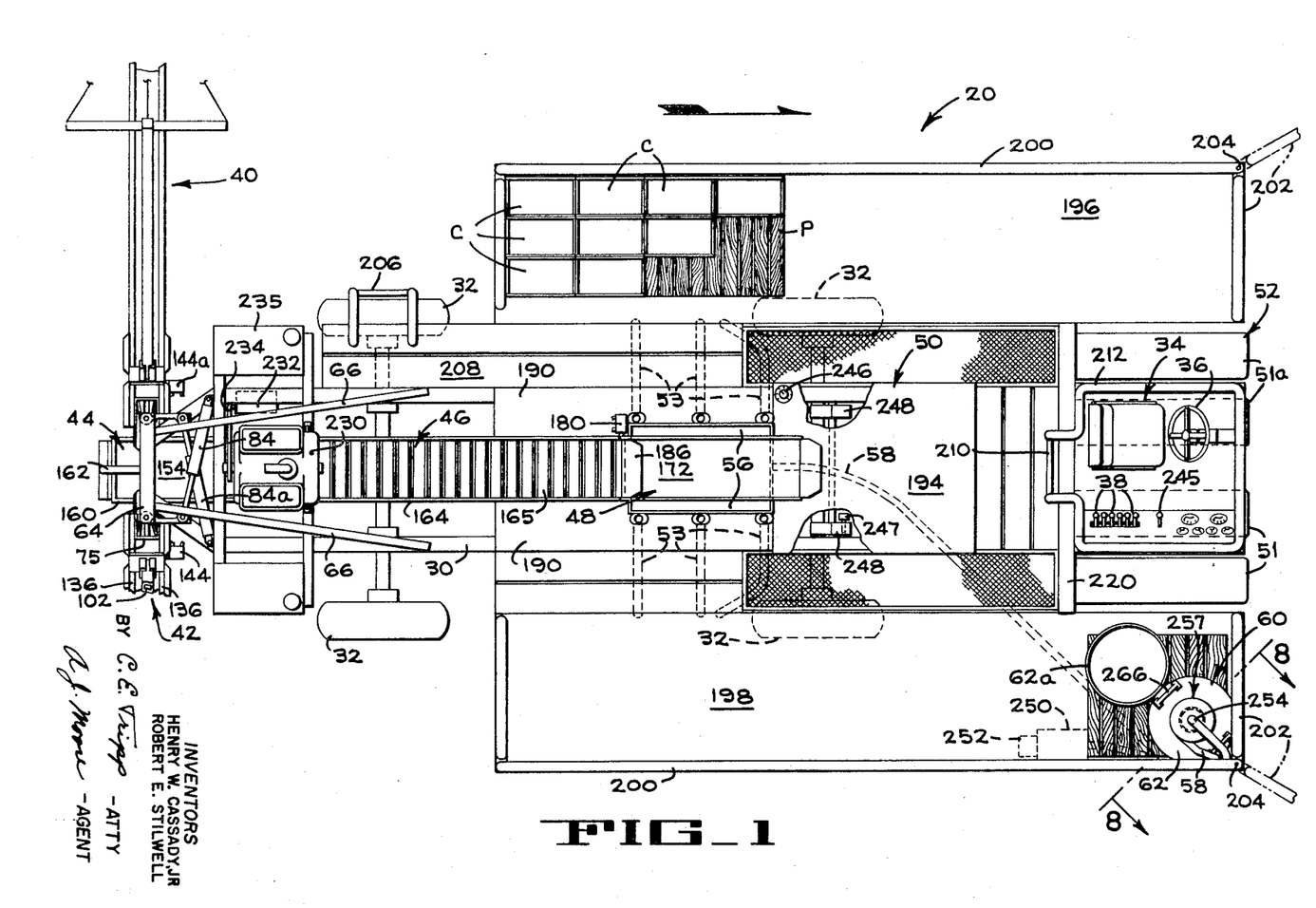
FIG. 1 is a plan of the harvester of the present invention with the outer portions of the boom conveyors and certain other parts broken away.

The row crop harvester 20, (FIGS. 1 and 2) comprises a self-propelled chassis 30 that is supported by four wheels 32 all of which may be steered by an operator or driver who is seated at an elevated drivers station 34 at the forward end of a harvester. The driver has the usual steering wheel 36, engine controls (not shown), and a plurality of hydraulic control valves 38 all within easy reach so that he may control and survey all of the operations of the harvester from his elevated station 34. A pair of boom conveyors 40 and 42 are pivotally mounted on the rear of the harvester and extend transversely across a plurality of rows 24 being harvested during the harvesting operation. A plurality of workmen are employed as fruit pickers who follow the boom conveyors picking berries from the rows 24 and depositing the berries onto the boom conveyors. The picked berries are conveyed inwardly by collecting means which includes a transfer conveyor 44, an elevator 46, and a sorting conveyor 48. The collecting means moves the berries to a packing station 50 where the high grade berries are packed or "containerized" into containers such as the usual baskets (not shown) and crates C (FIG. 1). For produce other than strawberries, the produce may be discharged directly into bins or similar bulk containers. The filled crates C are then placed on pallets P supported on pairs of fork lift tines 51 and 51a (FIGS. 1 and 7) of an unloader 52 for eventual lowering and deposit upon the ground. The culls and juice berries are picked from the sorting conveyor 48 by sorting personnel who drop the culls into tubes 53 which guide the culls into the valleys 26 in the path of movement of the rear wheels for crushing. The juice berries are dropped into a V-shaped trough 56 for gravitation into the berry transporting tube 58 of a vacuum conveyor 60 (FIG. 1) that draws the juice berries into a bulk shipping container such as a fifty-five gallon bulk storage drum 62.

An important feature of the invention is the apparatus for mounting the boom conveyors 40 and 42 on the chassis 30 of the harvester 20 so that the driver may easily pivot either or both booms vertically or horizontally as required.

As best shown in FIGS. 2, 4, 5 and 6, the chassis 30 has a vertically extending support member 64 rigidly secured to its rear end as by welding and is further braced by forwardly and downwardly extending bars 66. The support member 64 includes an upper plate 68 and a lower plate 70 (FIG. 4) which have apertured ear portions that extend outwardly from both sides of the support member 64. A vertically elongated right pivot tube assembly 72 is disposed between the upper and the lower right ears and is pivotally connected thereto by a vertically elongated pivot shaft 74. The right pivot tube 72 has a generally L-shaped fabricated bracket 75 (FIG. 4) welded to its lower end and having a horizontally extending bushed sleeve 76 (FIG. 6) welded thereto. The inner end of the right wing or boom conveyor 42 is pivotally connected to downwardly and outwardly inclined mounting brackets 80 that are rigid with the frame 82 of the right boom conveyor 42.

Figure 5:
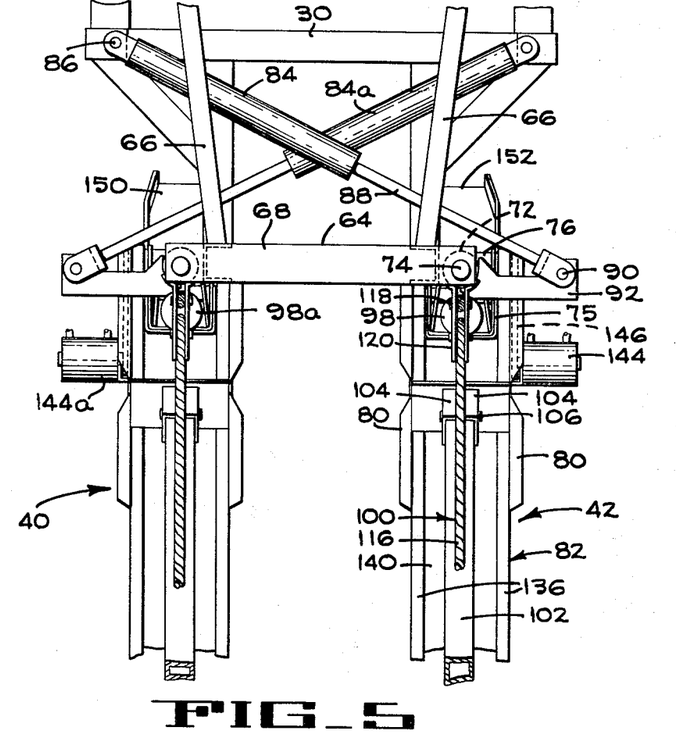
FIG. 5 is an enlarged plan of the rear portion of the machine illustrating a portion of each boom conveyor in their transport positions directed rearwardly of and parallel to the longitudinal axis of the harvester, only those parts pertinent to the mounting of the boom conveyors being illustrated.
Figure 6:
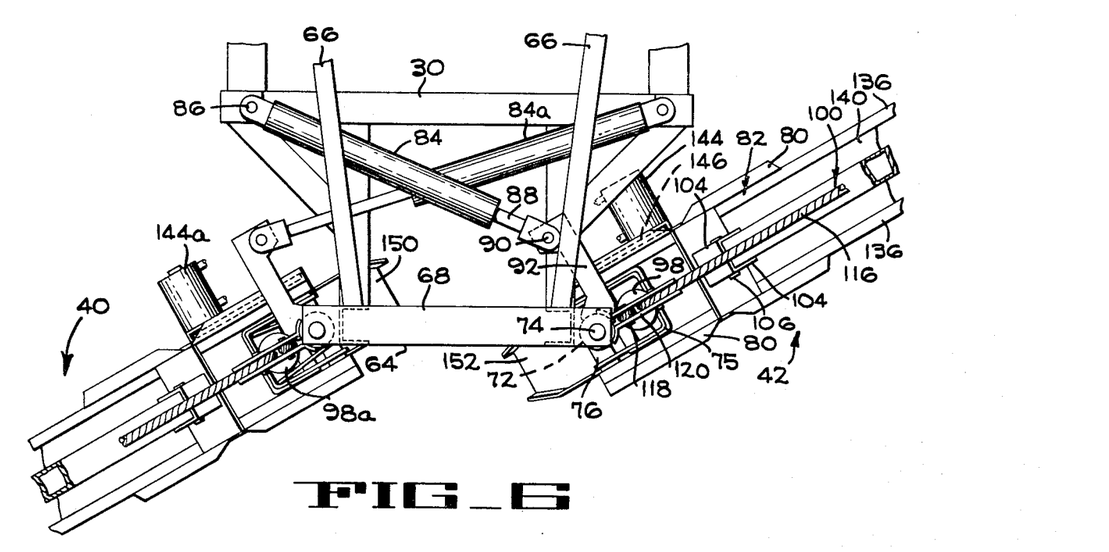
FIG. 6 is an enlarged plan similar to FIG. 5 but illustrating the wings when in a harvesting position that is not perpendicular to the direction of movement of the harvester.

The right boom conveyor 42 may be pivoted horizontally about the axis of the vertically elongated shaft 74 from the rearwardly directed transport position wherein its longitudinal axis is parallel to the direction of movement and to the longitudinal axis of the harvester as illustrated in FIG. 5, through a range of about 130° to any one of a plurality of harvesting positions within this range, such as the harvesting position illustrated in FIGS. 6 and 10. In order to pivot the boom conveyor 42 horizontally as above described, a hydraulic cylinder 84 is pivoted to the vehicle frame at 86 and has its connecting rod 88 pivoted by a pin 90 to a lever 92 that is welded to the right pivot tube assembly 72.

Figure 12:
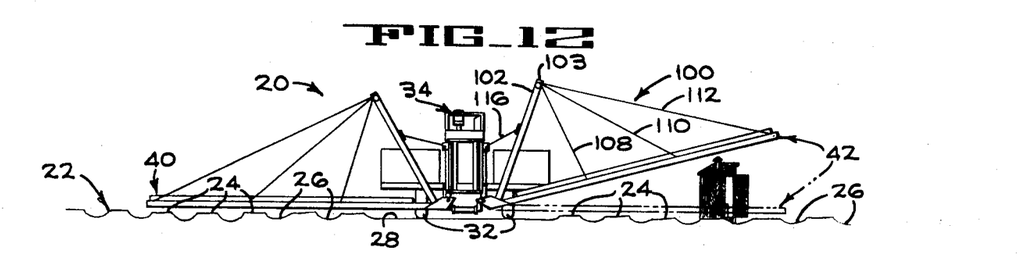
FIG. 12 is an operational view in rear elevation illustrating one wing in harvesting position and the other wing pivoted upwardly to avoid an obstruction in the field.

A vertically elongated hydraulic cylinder 98 (FIG. 4) and a cooperating cable supporting system 100 are provided in order to support the right boom conveyor 42 for movement to any position between its generally horizontal harvesting position and its upwardly pivoted position as illustrated in FIG. 12 in dotted lines and in full lines respectively.

The cable supporting system 100 includes a T-shaped upwardly and outwardly inclined cable support lever 102 (FIGS. 1 and 12) which has an upper cross bar 103 and also has its lower end rigidly secured to the wing mounting brackets 80 by channel members 104 (FIG. 4) and a cooperating pin 106. Three pairs of cables 108, 110 and 112 (FIG. 12) are connected between the ends of the upper cross bar 103 of the lever 102 and spaced points along the frame 82 of the boom conveyor 42. The cables in each pair are preferably crossed over each other, and a turnbuckle may be interposed in each cable connection to provide for minor adjustments and a more stable support of the elongated boom conveyor 42.

Figure 4:
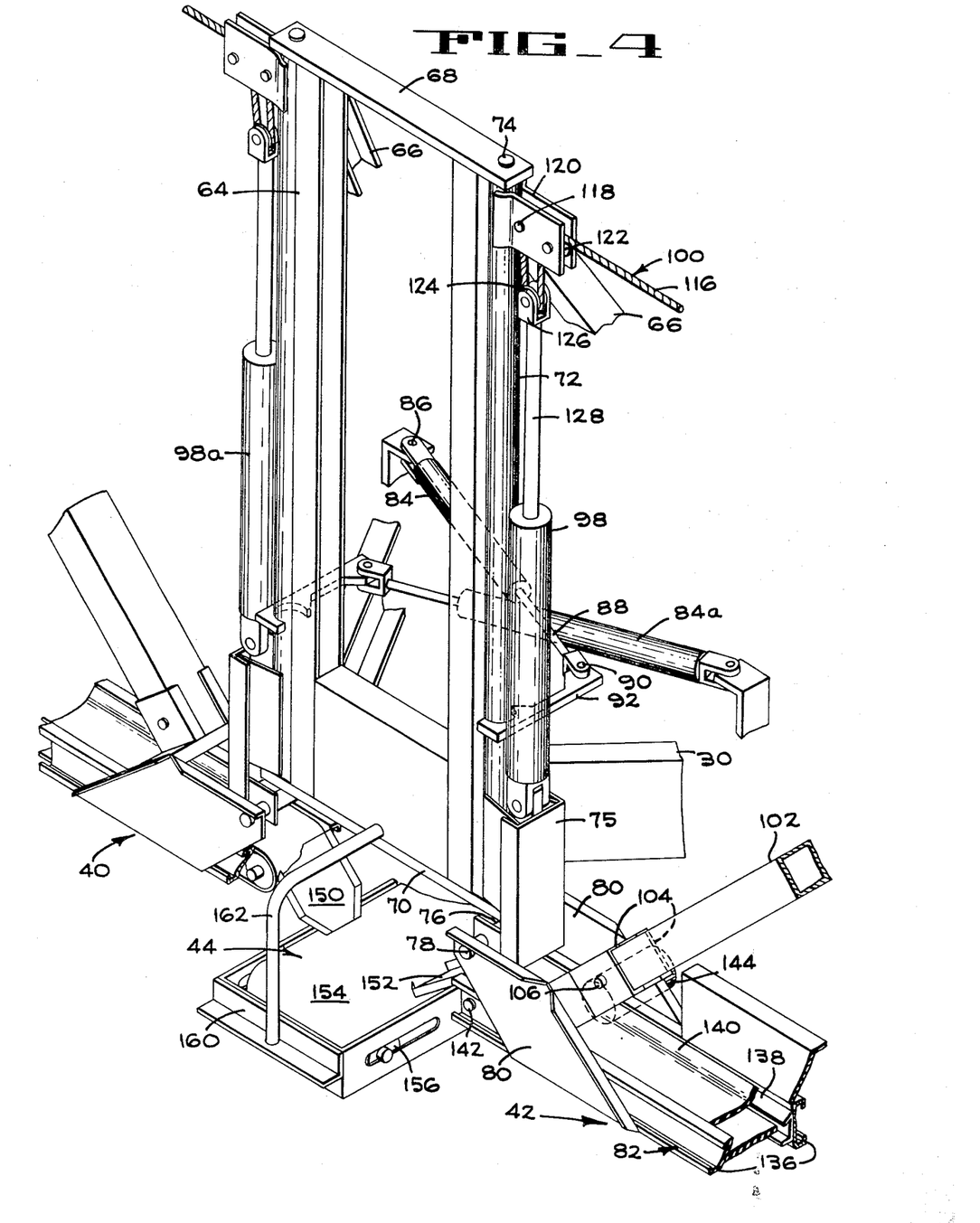
FIG. 4 is an enlarged perspective of the rear central portion of the harvester illustrating the structure for pivotally connecting the boom conveyors to the frame of the harvester.

A relatively short main lifting cable 116 has one of its ends anchored, with the aid of a turnbuckle (not shown) to the lever 102 intermediate the ends of the lever. The other end of the main cable 116 is anchored to a pin 118 (FIG. 4). The pin 118 is supported by a yoke 120 welded to the upper end of the right pivot tube assembly 72. The main cable 116 is trained around a pulley 122 journaled in the yoke 120 and around another pulley 124 journaled in a yoke 126 mounted on the free end of the piston rod 128 of the hydraulic cylinder 98. The use of the multiplying pulleys 122 and 124 serves to double the effective stroke of the cylinder 98. The driver may operate the cylinder 98 by actuating one of the control valves 38 from his position at the elevated drivers station 34 to raise and lower the right boom conveyor 42 as required.

The boom conveyors 40 and 42 are mirror images and are each about 55 feet long. The right boom conveyor 42 includes the mounting brackets 80 (FIG. 4) that are welded to the boom frame 82. The frame 82 includes a pair of spaced channel members 136 having transverse support members (not shown) disposed at spaced intervals throughout the length of the conveyor. The frame 82 also includes suitable guide rails 138 (only one being shown in FIG. 4) for supporting the upper and lower runs of an endless conveyor belt 140 which is trained around an inner pulley keyed to a shaft 142 journaled on the inner end of a boom conveyor frame 82. The belt 140 is also trained around a similar pulley (not shown) journaled on the outer end of the frame 82. The conveyor belt 140 is driven by a hydraulic motor 144 (FIG. 5) that is supported on the inner portion of the frame 82 and is connected in driving engagement to the shaft 142 by a chain drive 146 thereby driving the upper runs of the conveyor belt 140 inwardly toward the longitudinal centerline of the harvester.

Since the left boom conveyor 40 and the structure for pivotally connecting it to the rear support member 64 of the chassis 30 is substantially the same as the right boom conveyor and associated connections, the left boom and its connecting members will not be described in detail but will be assigned the same numerals given to the equivalent right members followed by the letter a.

Since strawberries are relatively soft and easily subject to injury if handled roughly, chutes 150 and 152 (FIG. 4) are pivoted to the inner ends of the boom conveyors 40 and 42, respectively, and allow the berries to gently gravitate from the boom conveyors down the chutes and onto the transfer conveyor 44.

Figures 2, 8:
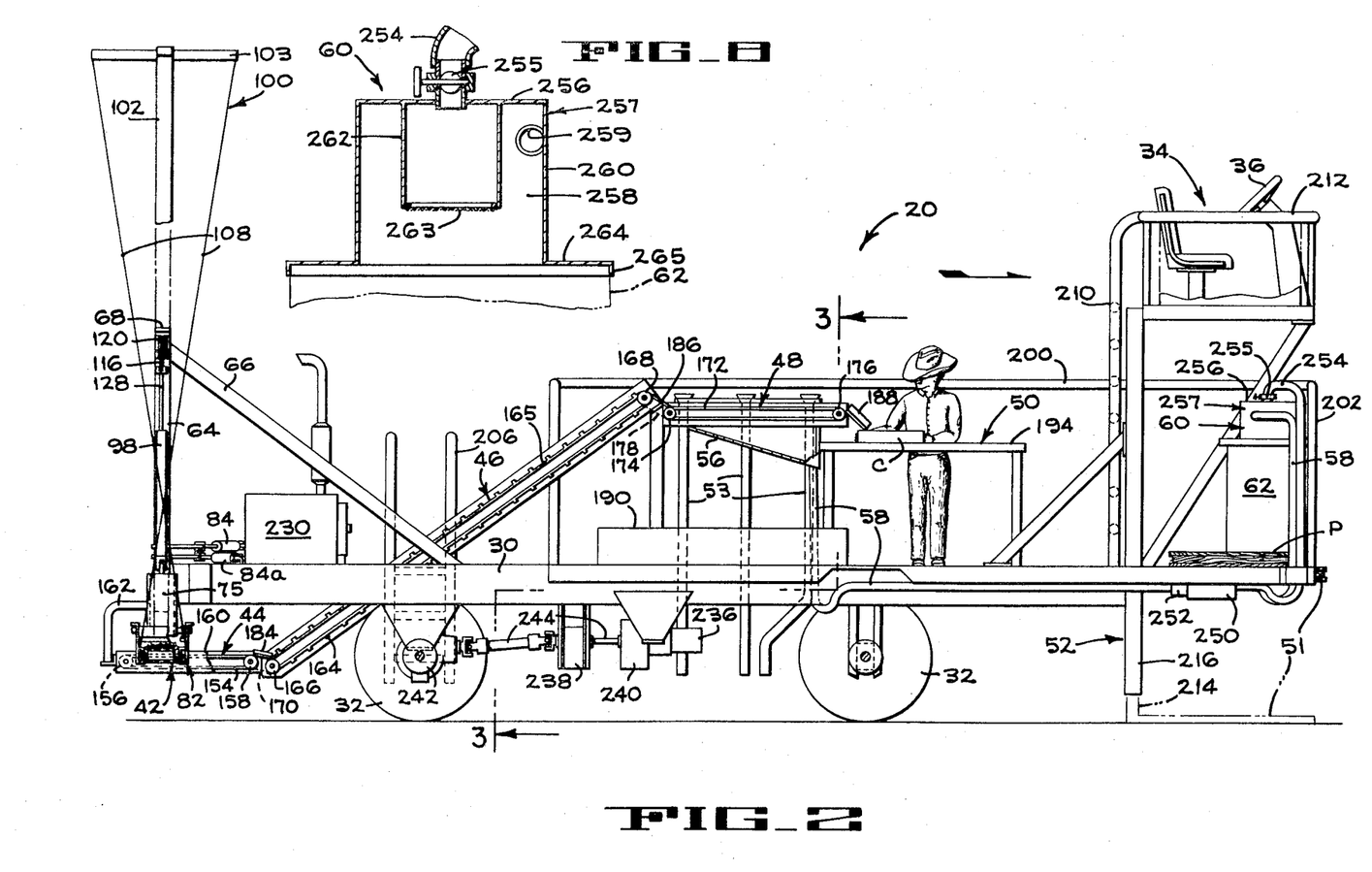
FIG. 2 is a side elevation of the harvester of FIG. 1, several parts being removed to better illustrate the operative components of the harvester.
FIG. 8 is an enlarged section taken along lines 8—8 of FIG. 1 illustrating the internal construction of the vacuum head.

As best shown in FIGS. 2 and 4, the transfer conveyor 44 comprises an endless conveyor belt 154 trained around rollers 156 and 158 journaled in a subframe 160. The sub-frame 160 has its rear end connected to the chassis frame by a curved bar 162 and has its front end rigidly connected to the frame 164 of the elevator 46.

The elevator 46 includes an endless slat conveyor 165 having its lower end trained around a roller 166 and its upper end trained around another roller 168. Both rollers are journaled in the elevator frame 164, and the forward roller 158 of the transfer conveyor 44 is connected to the lower roller 166 of the elevator by a chain drive 170.

The sorting conveyor 48 includes a relatively wide endless belt 172 trained around rollers 174 and 176 journaled in the chassis frame at an elevation slightly below the upper end of the elevator 46. A chain drive 178 connects the upper elevator roller 168 to the rear conveyor roller 174 to drivingly interconnect the elevator and sorting conveyor. A hydraulic motor 180 (FIG. 1) is connected to the upper elevator roller 168 thereby driving the upper runs of the transfer conveyor 44, the elevator 46, and the sorting conveyor 48 at the same speed and to the right (FIG. 1). Chutes 184, 186 and 188 are provided at the discharge ends of the transfer conveyor 44, the elevator 46, and the sorting conveyor 48, respectively, to provide for a gentle transfer of the berries. Raised steps or platforms 190 (FIG. 3) are disposed on both sides of the sorting conveyor thereby allowing three sorters to stand on each side of the conveyor 48 when performing their sorting operation.

As mentioned previously, the sorters drop the culls into the tubes 53, drop the juice berries into the V-trough 56, and allow the high grade berries to gravitate over the chute 188 where they are packed into containers such as crates C when supported on a table 194 by one or more operators. In order to provide a large supply of empty crates C, each of which may have twelve empty backets therein, platforms 196 and 198 (FIGS. 1 and 3) are mounted on opposite sides of the machine and are each of sufficient size to hold five pallets each loaded with 72 crates. The platforms 196 and 198 are also of sufficient width to permit the operator to walk the full length of the platform to remove empty crates C from any of the pallets. Although crates and baskets are usually used when packaging high grade berries, it will, of course, be understood that other types of containers may be used for the high grade berries.

Figure 3:
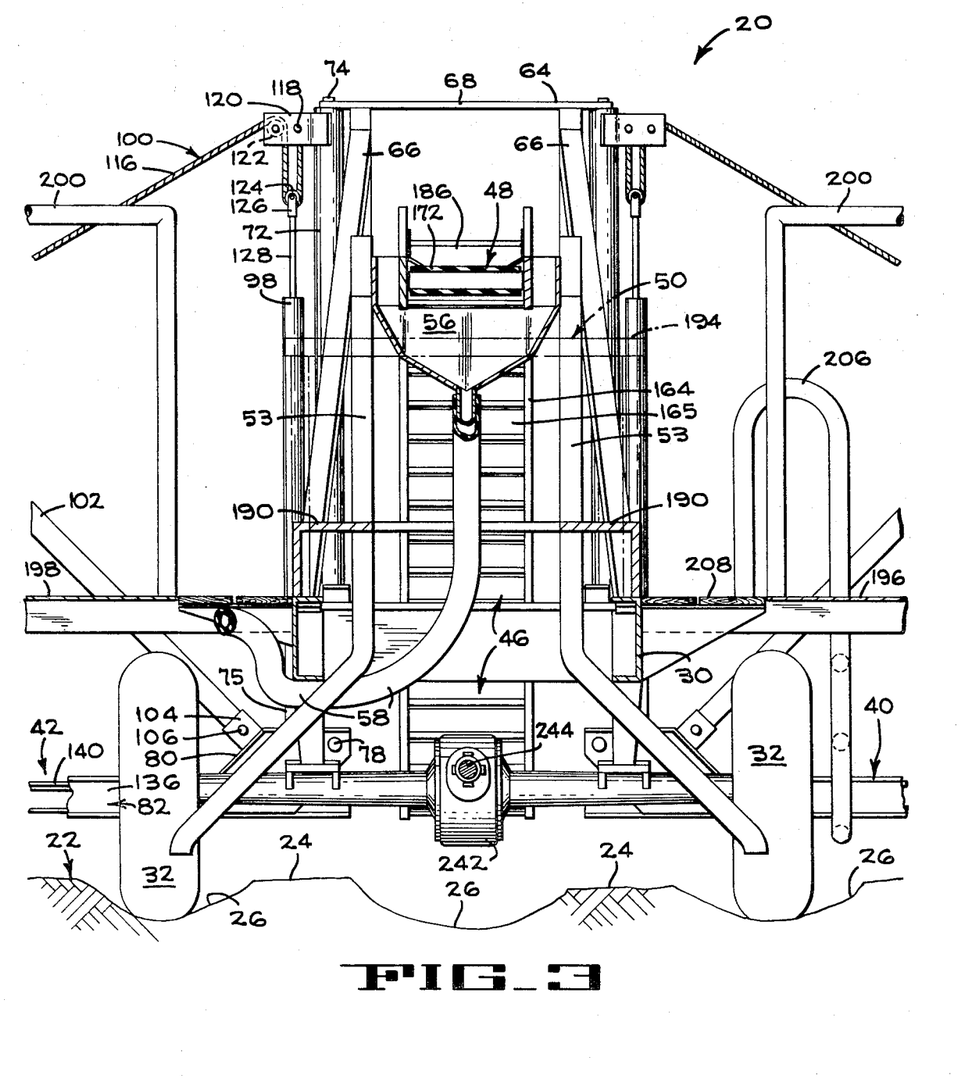
FIG. 3 is an enlarged vertical transverse section taken along lines 3—3 of FIG. 2 illustrating certain conveying means at the sorting area of the harvester.

A railing 200 is placed around the outer periphery of each platform 196 and 198, and each railing includes a door 202 pivoted about a hinge 204 and normally latched in the closed position as illustrated in FIG. 1. At the beginning of a day's operation, the doors 202 are opened and a fork lift truck loads a large supply of pallets containing empty baskets and crates onto the platforms 196 and 198. Also, other articles such as empty pallets P and a pallet having one or more 55 gallon drums thereon may be loaded onto the platforms at this time. The outer peripheries of the platform 196 and 198, and the railings 200 and doors 202 preferably have vertical canvas walls, (FIG. 7) stretched therebetween so as to act as windbreaks. As indicated in FIGS. 1, 2 and 3, a ladder 206 and a walk-way 208 on the left side of the harvester provides for easy access to the platform; and another ladder 210 and protection railing 212 integral therewith provides access to the operator station 34 from the platforms.

Figure 7:
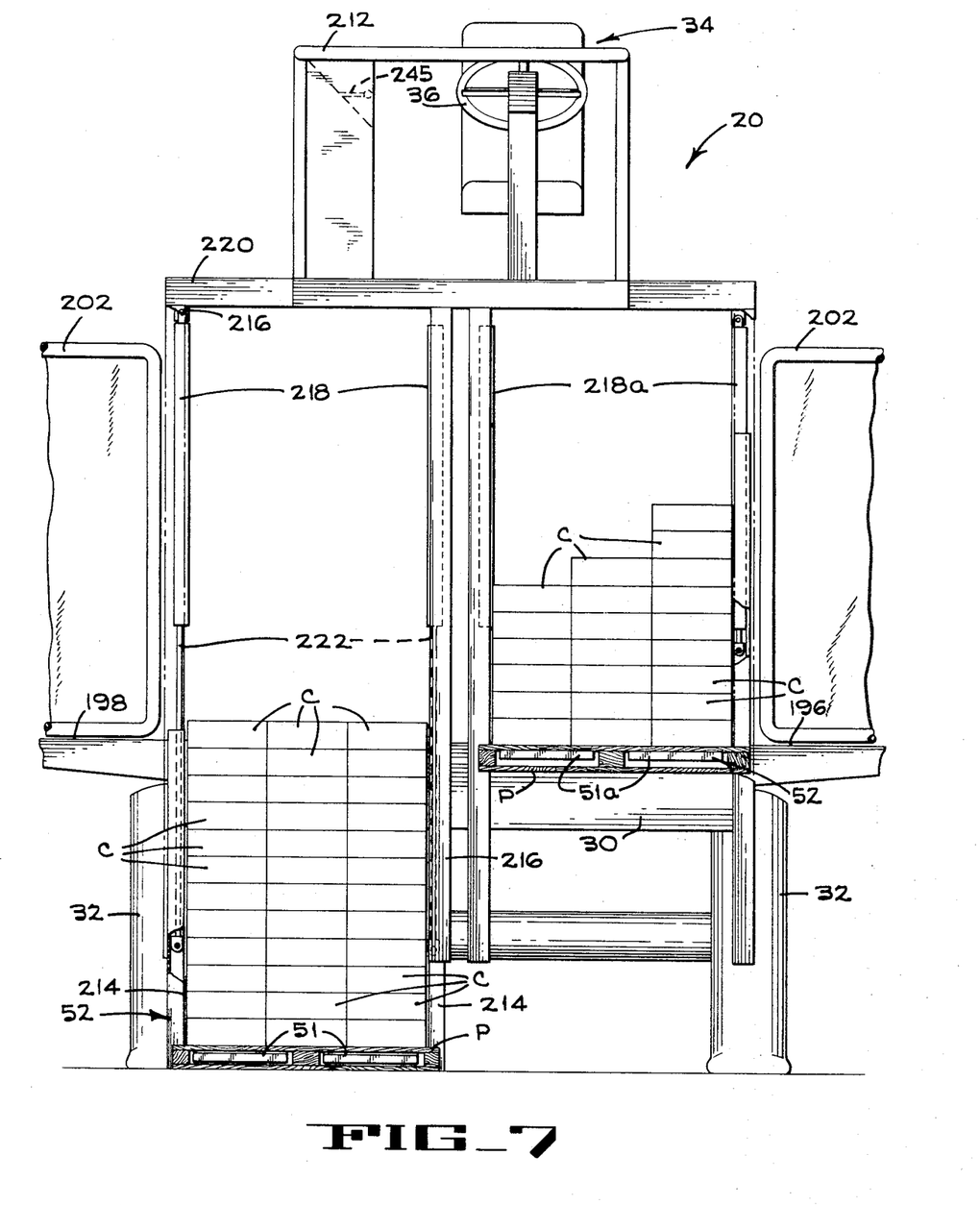
FIG. 7 is a front elevation of a portion of the harvester illustrating one pair of fork lift tines with a filled pallet thereon lowered to the ground and illustrating the other pair of tines in its loading position with a partially filled pallet thereon, certain parts being broken away to disclose operative structure.

The filled crates C or market berries are manually loaded onto one of two pallets P (FIG. 7) when supported by the previously mentioned pairs of fork lift tines 51 or 51a at an elevation level with that of the platform 196 and 198. As illustrated in FIG. 2 and 7 the pair of fork lift tines 51 are rigidly secured to upstanding channel slide bars 214 slidably received in channel members 216 secured to the chassis frame. A pair of hydraulic cylinders 218 are anchored to a cross beam 220 at the upper end of the associated channel member 216 and have their piston rods 222 connected to the tines 51 through the associated channel slide bars 214. The operator may independently control the cylinders 218 and 218a of each pair of fork lift tines 51 and 51a from the driver's station 34 by operating appropriate ones of the hydraulic valves 38 to either raise the tines to the loading position (shown at the right in FIG. 7) or to lower the tines to the unloading position.

In order to drive the several components of the harvester 20, an internal combustion engine 230 (FIGS. 1 and 2) drives a hydraulic pump 232 by means of a belt drive 234. The pump 232 receives its fluid from a tank 235 and supplies the fluid, under control of the valves 38; to the horizontal adjustment boom cylinders 84 and 84a, the vertical adjustment boom cylinders 98 and 98a (FIG. 4) and the fork lift cylinders 218 and 218a (FIG. 7). All of the above hydraulic units may be independently controlled by the operator by means of associated ones of the valves 38. The pump 232 also supplies fluid to a vehicle propulsion hydraulic motor 236 (FIG. 2) that drives the rear wheels of the vehicle through a transmission 238, a gear box 240, a differential 242, and the usual connecting shafts 244. Also, the vacuum pump 250 of the vacuum conveyor 60 is driven by a hydraulic motor 252.

As mentioned previously, the transfer conveyor 44, elevator 46, and sorting conveyor 48, are all driven by a single hydraulic motor 180 (FIG. 1). The hydraulic motor 180 and the hydraulic motors 144 and 144a to the boom conveyors are all controlled by the driver from the operator station 34 by means of a master valve 245. In addition to the master valve 245, a speed control valve 246 and a shut off valve 247 operated by pedals 248 provided at the packers station 50. These controls enable the packers or sorters to control the speed of all conveyors, or to stop all conveyors, in the event that difficulty arises such as an interruption in the supply of crates or the necessity of switching the suction conveyor 60 from one drum 62 to the other.

The vacuum conveyor 60 (FIGS. 1, 2 and 8) is especially designed to gently handle the soft, easily damaged juice berries by rapidly drawing berries tangentially into the system and allowing the berries to gently decelerate by spiraling down into the drum 62. The vacuum conveyor 60 comprises the vacuum pump 250 which draws about 1 psi gauge vacuum through a suction inlet tube 254 having a gate valve 255 therein that is connected to the top wall 256 (FIG. 8) of a vacuum head 257 that is removably placed on the open top of a 55 gallon drum 62 to be filled. As shown in FIGS. 1 and 8, the vacuum head 257 includes the top wall 256, which, except for the suction opening, closes the upper end of a cylindrical decelerating chamber 258 that has a berry intake sleeve 259 welded tangentially to the internal surfaces of the cylindrical wall 260 which defines the decelerating chamber 258 and is also connected to the berry conveying hose 58 (FIGS. 1 and 2). An open ended relatively large diameter sleeve 262 has its upper end welded to the top wall 256 concentric with the suction inlet tube 254 and has its lower end covered with a screen 263 thereby preventing berries from being drawn into the suction inlet tube upon filling of the drum. The lower open end of the cylindrical decelerating chamber 258 is welded to the inner surface of an opening in a mounting plate 264 which rests on and, upon application of vacuum, seals the upper open end of the drum 62 being filled. A skirt 265 on the outer periphery of the plate 262 maintains the vacuum head 257 on the drum 262, while handles 266 (FIG. 1) are provided to aid the operator in removing the head 257 from filled drums and placing the head on empty drums. Since approximately 1 psi vacuum is applied during operation, the gate valve 255 must be closed in order to break the vacuum within the vacuum head 257 before removing the head from the drum 62 and placing it on another empty drum 62a (FIG. 1). It will be appreciated that the vacuum conveyor will move the berries and will cause the berries to lose their velocity by spiralling within the head thereby greatly reducing deceleration damage to the juice berries.

Figure 11:
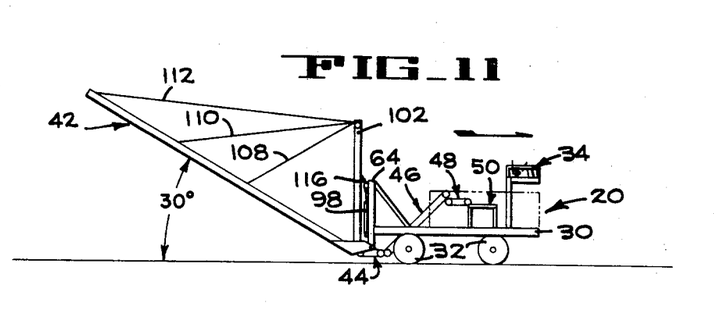
FIG. 11 is a side elevation of the harvester illustrating the boom conveyors in the raised transport position parallel to the direction of movement of the vehicle.

In operation, the harvester 20 (FIGS. 1, 9 and 10) is driven to the field to be harvested with the boom conveyors 40 and 42 in their transport positions directed rearwardly and upwardly as illustrated in FIG. 11. A large supply of empty pallets P, pallets loaded with empty crates C, and a pallet loaded with one or more juice berry drums, are loaded onto the platforms 196 and 198 by a fork lift truck. Also, two empty pallets are placed on the pairs of fork lift tines 51 and 51a (FIG. 7).

The harvester 20 is then driven along one of the boundary roads 28 (FIG. 9) or 28'(FIG. 10) of the field to be picked and is turned into the rows 24 at the desired location. The boom conveyors 40 and 42 are then lowered and swung transversely to positions parallel to the adjacent boundary road, but not necessarily perpendicular to the rows being harvested as illustrated in FIG. 10. It will be understood that the two boom conveyors may be pivoted to any horizontal position within an angle range of about 80° while the two conveyors are maintained parallel to a vertical reference plane extending through the longitudinal axis of one of the boom conveyors. When in this harvesting position the two boom conveyors 40 and 42 cover about 30 rows and enable about 30 pickers to commence picking at the same time as the harvester is continuously driven at a slow speed parallel with the rows. The pickers walk in the valleys 26 behind the boom conveyors 40 and 42 and deposit the picked berries into the boom conveyors. The picker who is directed behind the center of the harvester deposits his berries directly onto the transfer conveyor 44.

The strawberries are then conveyed inwardly onto the transfer conveyor 44, move up the elevator 46, and onto the sorting conveyor 48. Sorting personnel positioned on both sides of the sorting conveyor 48 pick out culls and drop them into the tubes 53 for discharge under the rear wheels of the harvester 20. The sorters also pick out the soft juice berries and drop them into the V-shaped trough 56 for conveyance into the bulk drums by means of the vacuum conveyor 60. The high grade berries are discharged over the chute 188 and are containerized in containers such as baskets and crates C which when filled are manually stacked by one or more packaging personnel onto the pallets P supported on the fork lift tines 51 and 51a (FIG. 7) of the unloader 52.

Upon reaching the boundary road 28 (FIG. 9) or 28' (FIG. 10) at the other end of the field being harvested and after the pickers have finished their rows, the operator turns the vehicle onto the boundary road and drives the vehicle a short distance beyond the point of re-entry into the field. The operator then activates the unloader 52 to lower the filled pallet or pallets of market berries onto the ground by means of fork lift tines 51 and/or 51a and also if necessary has a fork lift truck remove a pallet containing a filled drum of juice berries. The operator then reverses the direction of movement of the harvester 20, places empty pallets on the tines 51 and 51a, and re-enters the field at the proper location to repeat the above described sequence of operation. During the maneuvers from the field onto the boundary road and back onto the field, the operator may find it desirable to raise one or both wings approximately 30° so as to avoid contacting pickers or obstacles on the ground.

The driver from his elevated station 34 may control the forward speed of the harvester to that of the slowest group of pickers during harvesting and at much faster speeds during transportation, and may vertically adjust either boom conveyor as required to move over obstructions as indicated in FIG. 12. The operator may also independently adjust each boom conveyor 40 and 42 horizontally through a range of about 130° from a rearward position parallel to the axis of the harvester to an operating position parallel to the adjacent boundary road thereby allowing all pickers to start at the same time when harvesting rows 24 that are not perpendicular to the boundary road 28' as indicated in FIG. 10. Also, the sorting or packaging personnel may control the speed of all conveyors, or may stop all conveyors for short periods if necessary, while the pickers continue to pick the berries and the harvester continues to move forwardly across the field.

From the foregoing description it is apparent that the row crop harvester of the present invention includes boom conveyors each of which may be independently adjusted vertically to avoid obstructions, and each of which may independently be adjusted from a rearward direction parallel to the axis of the harvester through a range of about 130°. The boom conveyors may therefore be adjusted parallel to boundary roads thus permitting all pickers to start at the same time even though the approximately 30 rows being picked by 30 pickers are not disposed perpendicular to the boundary roads. The harvester also includes sorting and packaging stations, and a vacuum conveying system for gently handling very soft berries.

Although the best mode contemplated for carrying out the present invention has been herein shown and described, it will be apparent that modification and variation may be made without departing from what is regarded to be the subject matter of the invention.

What we claim is:

1. A row crop harvester for simultaneously harvesting produce from a multiplicity of rows which are disposed in an acute angle relative to a boundary road comprising, a mobile self propelled vehicle having a chassis and adapted to be driven from the boundary road into the rows in a direction parallel to said rows, a pair of elongated boom conveyors supported on said chassis for horizontal pivotal movement over a multiplicity of rows being harvested simultaneously and each conveyor is adapted to receive produce deposited thereon by a multiplicity of manual pickers when the conveyors are in their substantially horizontal harvesting positions over the rows, means on said chassis for collecting and moving the produce to a packing station, and controllable power means for selectively adjusting and maintaining said boom conveyors substantially horizontal and parallel to a vertical plane while in their harvesting positions and while horizontally pivoting said boom conveyors to any position within an angle range of about 80° for positioning said conveyors parallel to the boundary road allowing all pickers to commence picking at the same time after the harvester has been moved into the rows to be harvested from the boundary road.

2. An apparatus according to claim 1 and additionally comprising means for mounting each boom conveyor to said chassis for vertical pivotal movement, and selectively operable power means for independently pivoting each boom conveyor between said substantially horizontal harvesting position and a position inclined upwardly about 30 degrees for permitting the boom conveyors to move over tall obstructions in their paths of movement.

3. An apparatus according to claim 1 wherein said controllable power means includes an independently controllable power unit for each boom conveyor, and wherein each independently controllable power unit is capable of horizontally pivoting its associated boom conveyor about 130° from a position directed rearwardly of and parallel to the direction of movement of said chassis.

4. An apparatus according to claim 3 and additionally comprising means for mounting each boom conveyor to said chassis for vertical pivotal movement, and selectively operable second power means for independently pivoting each boom conveyor between a substantially horizontal harvesting position and a position inclined upwardly about 30°.

5. An apparatus according to claim 1 wherein said conveyors and said collecting means are power operated conveying means, and additionally comprising control means at said packaging station for controlling the speed of said collecting conveying means or stopping said conveying means.

6. A row crop harvester for simultaneously harvesting produce from a plurality of rows which are disposed at an acute angle relative to a boundary road comprising, a mobile self-propelled vehicle including a chassis having a front and a rear end and a longitudinal axis extending parallel to the direction of movement of the vehicle, said vehicle being adapted to be driven from the boundary road into the rows in a direction parallel to said rows, a pair of elongated boom conveyors supported on said chassis for horizontal pivotal movement over approximately 30 rows being harvested simultaneously and adapted to receive produce deposited thereon by approximately 30 manual pickers when the conveyors are in their substantially horizontal harvesting positions over the rows, means on said chassis for collecting and moving the produce between the boom conveyors and a packing station, and controllable power means for selectively adjusting and maintaining said boom conveyors parallel to a vertical plane while in their generally horizontal harvesting positions and while horizontally pivoting said boom conveyors to any position within an angle range of approximately 30° extending from a position wherein one boom conveyor is angled outwardly and forwardly about 50° from the longitudinal axis of the vehicle.

7. In a row crop harvester which includes a mobile self-propelled vehicle having a chassis with a longitudinal axis extending from the front to the rear end, a pair of elongated boom conveyors each including a conveyor frame, and means supporting each boom conveyor for horizontal and vertical pivotal movement on said chassis; each boom conveyor supporting means comprising an upstanding frame member rigidly secured to the chassis, a vertically elongated pivot tube assembly, means pivotally connecting said pivot tube assembly to said frame member for pivotal movement about a vertical axis, horizontal pivot means connecting one end of one of said boom conveyors frames to the lower end of said pivot tube assembly, a cable supporting lever having its lower end rigidly secured to said boom conveyor frame adjacent said one end and projecting upwardly and outwardly therefrom, a plurality of cables connecting the upper end of said lever to spaced outer portions of said boom conveyor frame, first power means carried by said pivot tube assembly and operatively connected to said lever, and control means for selectively activating said power means for pivotally raising or lowering said lever and attached wing, and second power means interconnected between said chassis and said pivot tube assembly, and second control means for selectively actuating said second power means to pivot said pivot tube assembly and attached boom conveyor horizontally through a range of about 130° from a position directed rearwardly and parallel to the longitudinal axis of the vehicle to a position directed forwardly and outwardly of the vehicle.

8. A method of simultaneously harvesting produce with a harvester of the type having horizontally and vertically adjustable boom conveyors, comprising the steps of moving the harvester from a boundary road onto a field having a plurality of rows of produce projecting from the boundary road and disposed at an acute angle relative thereto, adjusting each of the boom conveyors to lie parallel to the boundary road and to extend substantially horizontally over a multiplicity of rows to be harvested during the harvesting operation, maintaining each boom conveyor in its adjusted position during the harvesting operation, moving the conveyor across the field in a direction parallel to the rows, simultaneously receiving picked produce placed on each boom conveyor by a multiplicity of manual pickers, conveying the picked produce transversely inwardly toward the middle of the series of rows being harvested during the harvesting operation, and collecting and packaging the picked produce.

9. A method according to claim 8 and additionally including the steps of pivoting the boom conveyors to parallel side-by-side transport positions directed rearwardly of the harvester and upwardly about 30° when the harvesting operation is terminated and it is desired to transport the harvester from place to place.

* * * * *

UNITED STATES PATENT OFFICE
CERTIFICATE OF CORRECTION

Patent No. 3,724,168        Dated April 3, 1973

Inventor(s) HENRY W. CASSADY, JR. and ROBERT E. STILWELL

It is certified that error appears in the above-identified patent and that said Letters Patent are hereby corrected as shown below:

Column 10, line 45, after "vehicle" and before the period insert --to a position wherein the other boom conveyor is angled outwardly and forwardly about 50 degrees from the longitudinal axis of the vehicle--.

Signed and sealed this 3rd day of December 1974.

(SEAL)
Attest:

McCOY M. GIBSON JR.
Attesting Officer

C. MARSHALL DANN
Commissioner of Patents